(12) United States Patent
Foldesi et al.

(10) Patent No.: US 11,926,496 B2
(45) Date of Patent: *Mar. 12, 2024

(54) AUTOMATED HANDLING OF SHIPPING CONTAINERS AND CONNECTORS

(71) Applicants: Steve Foldesi, Puyallup, WA (US); William Hawke, Puyallup, WA (US); Kyoung Shik Min, Seongnam-si (KR)

(72) Inventors: Steve Foldesi, Puyallup, WA (US); William Hawke, Puyallup, WA (US); Kyoung Shik Min, Seongnam-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 18/082,163

(22) Filed: Dec. 15, 2022

(65) Prior Publication Data
US 2023/0131923 A1 Apr. 27, 2023

Related U.S. Application Data

(60) Continuation of application No. 16/847,414, filed on Apr. 13, 2020, now Pat. No. 11,542,110, which is a continuation of application No. 15/925,726, filed on Mar. 19, 2018, now Pat. No. 10,618,755, which is a
(Continued)

(51) Int. Cl.
| | |
|---|---|
| *B65G 67/60* | (2006.01) |
| *B66C 13/48* | (2006.01) |
| *B66C 19/00* | (2006.01) |
| *G06Q 10/0631* | (2023.01) |
| *G06Q 10/083* | (2023.01) |
| *G06Q 10/10* | (2023.01) |

(52) U.S. Cl.
CPC ............ *B65G 67/603* (2013.01); *B66C 13/48* (2013.01); *B66C 19/002* (2013.01); *G06Q 10/06313* (2013.01); *G06Q 10/083* (2013.01); *G06Q 10/10* (2013.01)

(58) Field of Classification Search
CPC ....... B63B 27/24; B63B 67/603; B66C 13/48; B66C 19/002; B65G 67/603
USPC ............ 414/800, 137.1, 139.8, 139.9, 140.1, 414/140.3
See application file for complete search history.

(56) References Cited

U.S. PATENT DOCUMENTS

| | | | |
|---|---|---|---|
| 4,552,082 A | 11/1985 | Grey | |
| 5,163,726 A * | 11/1992 | Boos | ...................... B66C 1/663 |
| | | | 294/81.1 |
| 6,224,307 B1 | 5/2001 | Johnson et al. | |

(Continued)

*Primary Examiner* — Saul Rodriguez
*Assistant Examiner* — Willie W Berry, Jr.
(74) *Attorney, Agent, or Firm* — Genius Patent APC; Bruce Angus Hare

(57) ABSTRACT

A system for managing shipping containers and twist lock connectors is described. The system includes multiple stations. Each station includes a container platform and a pallet station. The container platform is able to accommodate various container sizes and/or multiple containers at one time. The container platform includes connector changers, handlers, and gantries that are able to automatically engage connectors with a container and disengage connectors from a container. The station includes a shuttle able to transfer connectors between the platform handlers and pallet station handlers and gantries. The pallet station includes a pallet with multiple receptacles for storing connectors. The pallet station and/or the container platform may include one or more magazines and/or one or more conveyors.

17 Claims, 15 Drawing Sheets

Related U.S. Application Data division of application No. 14/727,348, filed on Jun. 1, 2015, now Pat. No. 9,981,812.

(60) Provisional application No. 62/008,467, filed on Jun. 5, 2014.

(56) References Cited

U.S. PATENT DOCUMENTS

| | | |
|---|---|---|
| 6,537,009 B1 | 3/2003 | Lan et al. |
| 7,779,604 B2 | 8/2010 | Kapelski |
| 7,972,102 B2 | 7/2011 | Ward et al. |
| 8,056,217 B2 | 11/2011 | Hay |
| 8,210,418 B1 * | 7/2012 | Landoll .............. B23K 37/0452 228/43 |
| 8,488,884 B2 | 7/2013 | King et al. |
| 8,562,265 B2 | 10/2013 | Hay |
| 9,981,812 B2 | 5/2018 | Foldesi et al. |
| 10,618,755 B2 | 4/2020 | Foldesi et al. |
| 2006/0115350 A1 | 6/2006 | Weis |
| 2008/0252417 A1 | 10/2008 | Thomas et al. |
| 2010/0320265 A1 | 12/2010 | Hay |
| 2012/0288349 A1 | 11/2012 | Bohman |
| 2012/0321418 A1 | 12/2012 | Bohman |
| 2014/0271089 A1 | 9/2014 | Brown et al. |

* cited by examiner

AUTOMATED HANDLING OF SHIPPING CONTAINERS AND CONNECTORS

CROSS-REFERENCE TO RELATED APPLICATIONS

This application is a continuation of U.S. patent application Ser. No. 16/847,414, filed on Apr. 13, 2020. U.S. patent application Ser. No. 16/847,414 is a continuation of U.S. patent application Ser. No. 15/925,726, filed on Mar. 19, 2018. U.S. patent application Ser. No. 15/925,726 is a division of U.S. patent application Ser. No. 14/727,348, filed on Jun. 1, 2015. U.S. patent application Ser. No. 14/727,348 claims priority to U.S. Provisional Patent Application Ser. No. 62/008,467, filed on Jun. 5, 2014.

BACKGROUND

Many goods and materials are shipped worldwide. Such shipping may typically entail utilizing shipping containers to store and transport the goods and materials. These shipping containers are usually stacked, hoisted, and/or locked using twist lock connectors or "cones" that may be attached (or "installed") to a first container and then used to couple the first container to a second container. Additional containers may be similarly placed in a vertical stack. The cones may be associated with a shipping vessel, and as such, must be attached to containers as they are loaded onto the vessel and removed from containers as they are unloaded.

Current solutions require human intervention to place or remove the connectors, requiring workers to perform tasks that can be dangerous and time consuming. In addition, human intervention is needed to transfer cones back to an associated vessel. In addition, existing solutions may only be able to handle a limited quantity of cones. Furthermore, existing solutions may not allow cones to be automatically removed and attached or allow for convenient storage and/or monitoring of equipment such as container connectors. Existing solutions may also be limited to use with containers of particular size.

Thus there is a need for a fully automated solution that is able to remove and attach cones, deal with an unlimited quantity of connectors, and be able to handle multiple container sizes.

SUMMARY

Some embodiments provide a shipping container management station. Such a station may include one or more container platforms and one or more pallet stations.

Each container platform may provide a substantially flat surface of appropriate size for placing one or more shipping containers (and/or differently sized containers). The platform may include various guides, clamps, etc. that allow each container to be securely coupled to the platform. The platform may include a set of access holes through the flat surface that correspond to twist lock connector receptacles on the container.

The platform may include a set of connector changers that are able to attach a connector to a container or detach a connector from a container via an access hole. Each connector changer may be able to move relative to the platform along at least one axis such that different arrangements of container receptacles may be supported (e.g., for different sized containers, for different combinations of containers, etc.).

The platform may include at least one gantry and associated set of handlers. The gantry may be able to move along a first axis. Each handler may be able to move along a second axis that is perpendicular to the first axis. In addition, each handler may include at least one gripper that is able to retrieve and secure a connector and release a connector. The grippers may be able to move along a third axis that is perpendicular to the first and second axes.

Each handler may be able to provide connectors to and/or receive connectors from at least one changer. In addition, each handler may be able to transfer connectors to and/or retrieve connectors from a shuttle. The shuttle may be able to receive connectors from each handler and/or provide connectors to each handler. The shuttle may include a connector transport that moves along the second axis.

Some embodiments may include a set of robotic arms. Such arms may be associated with the changers, handlers, gantries, shuttle, and/or other appropriate elements. Each robotic arm may be able to move along a set of vectors within a multi-dimensional space and may replace one or more of the other movement elements, as appropriate.

The pallet station may include at least one gantry and at least one associated handler. The gantry and handler may be able to provide connectors to and/or receive connectors from the shuttle. The handler may include two grippers that maintain a fixed position relative to each other.

The pallet station may include a pallet having a set of receptacles able to receive connectors from a handler, provide connectors to a handler, or store received connectors. Alternatively, the pallet may include a set of receptacles and a set of bins, where each bin is able to hold multiple connectors. As another alternative, the pallet may include only a set of bins and no receptacles.

The preceding Summary is intended to serve as a brief introduction to various features of some exemplary embodiments. Other embodiments may be implemented in other specific forms without departing from the spirit of the disclosure.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the invention is best defined by the appended claims.

Various inventive features are described below that can each be used independently of one another or in combination with other features. Broadly, some embodiments generally provide ways to perform automated loading and unloading of shipping containers, including automated handling of container connectors.

Various example system elements, features, devices, etc. are shown in the appended drawings. One of ordinary skill in the art will recognize that such components may be implemented in various different ways without departing from the spirit of the disclosure.

Throughout this disclosure, various examples may refer to a "vessel" or "ship" and/or features associated therewith. One of ordinary skill in the art will recognize that the features described throughout the disclosure may be applied to different types of vehicle (e.g., motor vehicles, rail vehicles, watercraft, aircraft, spacecraft, etc.) and/or various different applications (e.g., ground transport, rail transport, military transport, heavy construction, etc.) that may also utilize standardized containers and cone attachments.

A first exemplary embodiment provides a system able to manage shipping containers and twist lock connectors. The system includes: a platform able to receive a set of shipping containers; a set of connector changers associated with the platform; a shuttle associated with the platform; and at least one gantry, each gantry having a set of associated handlers able to transfer connectors between at least one connector changer and the shuttle.

A second exemplary embodiment provides an automated method of unloading a shipping vessel. The method includes: receiving a shipping container from the shipping vessel; retrieving a pallet able to store a plurality of connectors; detaching multiple connectors from the shipping container; transferring the connectors to the pallet; and releasing the container.

A third exemplary embodiment provides an automated method of loading a shipping vessel. The method includes: receiving a shipping container; retrieving a pallet having multiple connectors; retrieving the connectors from the pallet; attaching the connectors to the shipping container; and providing the container to the shipping vessel.

Several more detailed embodiments are described in the sections below. Section I provides a description of various exemplary system architectures. Section II then describes various methods of operation used by some embodiments. Lastly, Section III describes a computer system which implements some of the embodiments.

I. System Architecture

A. Physical Architecture

Figure 1:
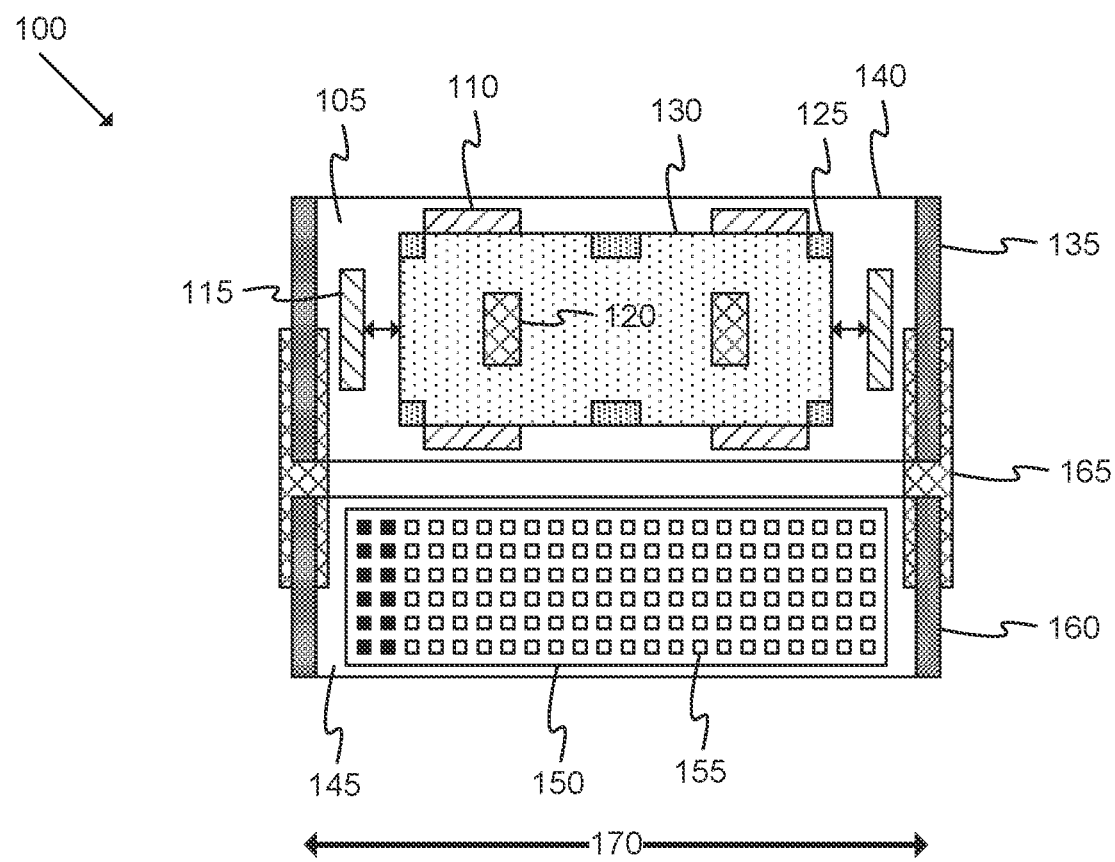
FIG. 1 illustrates a top view of a container handling system according to an exemplary embodiment.

FIG. 1 illustrates a top view of a container handling system 100 according to an exemplary embodiment. As shown, the system may include a platform 105, various guides and clamps 110-120, access holes 125, one or more shipping containers 130, a first set of gantries 135 and associated rails 140, a pallet support 145, pallet 150 with associated receptacles 155, a second set of gantries 160, and a set of shuttles 165. In addition, a first axis 170 may be associated with a movement path of the gantries 135 and 160.

The platform 105 may be made of metal or other appropriate materials and may include various supports, footings, etc., as appropriate. The platform may be able to support one or more shipping containers 130 (and/or other types of containers) of varying size (e.g., shipping containers having a length of twenty feet, forty feet, forty-five feet, fifty-three feet, fifty-eight feet, etc.).

The guides 110 may be positioned and shaped such that as a storage container 130 is lowered into place the container is automatically placed in the correct position for attaching and/or detaching connectors. The clamps 115 may be similarly shaped and sized as the guides 110. The clamps 115 may be able to move along axis 170 such that containers 130 may be secured in place and/or such that different size containers may be handled.

In this example, the guides/clamps 120 may be able to move to a "disengaged" position such that they do not protrude past the surface of the platform 105 in order that a shipping container 130 may be able to be placed adjacent to the surface. The clamps 120 may be able to move to an engaged position such that at least a portion of the clamp extends past the surface of the platform 105 in a similar manner to guides 110 or clamps 115. In some embodiments, the clamps 120 may be able to move along axis 170 to allow additional positioning. With the clamps 120 in such an engaged position, the platform 105 may be able to receive containers 130 of different size or shape and/or different numbers of containers. Such configurations may include, for example, a single twenty foot container, two twenty foot containers placed end-to-end, a single forty foot, forty-five foot, fifty-three foot, of fifty-eight foot container, dual forty foot, forty-five foot, fifty-three foot, or fifty-eight foot containers placed side-by-side, etc.

Each access hole 125 may be associated with a cone changer. The access holes may be of different size and/or orientation such that an associated cone changer may be moved relative to the platform 105 (and container 130) and different container configurations may be managed. Each hole 125 may be sized and positioned such that a cone associated with a receptacle of the container 130 may be attached to the container and/or detached from the container via the hole 125. Holes may typically be located at exterior corner locations associated with the containers (e.g., the square holes in this example). In addition, holes may be located within the body of the container 130 and/or at "interior" corners when multiple containers are loaded (e.g., the rectangular holes in this example). Different embodiments may include different numbers of holes 125, differently sized holes, and/or differently positioned holes.

The shipping container 130 may be made of various appropriate materials (e.g., steel, aluminum, etc.) and/or combinations thereof. Lengths may vary from about eight to fifty-six feet. Height and width may vary from about eight to ten feet and may generally be equal. In addition to these examples, various other configurations may be used. For instance, different embodiments may utilize differently sized containers, differently shaped containers, and/or otherwise modified containers.

Each gantry 135 may be able to be moved along supports 140 parallel to axis 170. Each gantry 135 may include various motors, controllers, sensors, etc. that may allow the gantry to move along the rails 140 to a specified position relative to the platform 105.

The pallet support 145 may be able to support one or more pallets 150. The support 145 may provide a flat surface (or set of beams or joists) that is able to receive a pallet 150 and hold the pallet in a particular location. In some embodiments the support may include various guides, clamps, etc. that may be used to position the pallet during use.

The pallet may have a generally flat top surface with various receptacles 155 spaced throughout the surface. The number of receptacles per pallet 150 may vary according to the application, the size of the pallet, and/or other relevant factors. In some embodiments, each pallet 150 may include between fifty and one thousand receptacles 155 (e.g., four hundred receptacles).

The pallet 150 may include a frame or other structural elements. Some embodiments may include a pallet handler or otherwise be able to manipulate pallets such that multiple pallets may be used if necessary. As an example, some embodiments may determine that a pallet is full (or almost full) and send a request message for an additional pallet. Such a request may be relayed to an appropriate resource (e.g., a crane, lift, truck, etc.) and the other resource may provide the pallet.

In addition, some embodiments may allow pallets to be tilted such that any stored cones are released and may be transferred to other storage elements (e.g., bins). For instance, the pallet may be able to be rotated about an axis that is parallel to axis 170. In this way, any unused cones may be easily returned to a shipping vessel as the cones are typically associated with the ship. Alternatively, the cones may be released directly into bins (e.g., via holes in portions of the pallets) and/or removed from the pallets 150 and placed in bins using a handler or other appropriate device.

Each receptacle 155 may be able to receive and store a connector. In some embodiments, the receptacles may include sensors and/or other elements that allow the receptacles to determine whether a connector currently resides at the receptacle.

Each gantry 160 may be able to be moved along supports 140 parallel to axis 170. Each gantry 160 may include various motors, controllers, sensors, etc. that may allow the gantry to move along the rails 140 to a specified position relative to the support 145.

Each shuttle 165 may include a set of receptacles that are able to transfer connectors between gantry 135 and gantry 160. In this example, there are two shuttles 165 and two of each type of gantry 135 and 160. Different embodiments may include different numbers of each element, configured appropriately (e.g., such that the platform is divided into evenly-sized sections server by each gantry).

Some embodiments may include a rotary conveyor associated with each platform 105. Such a conveyor may be able to receive connectors from gantry 135 and/or supply connectors to the gantry. Such a conveyor may allow the platform 105 to be utilized when no pallet 150 is available (e.g., when an empty pallet is being loaded) and/or when the pallet platform 145 is undergoing maintenance or repair. The system may be able to transfer connectors from the conveyors to a pallet when one becomes available. In addition, when loading containers, connectors may be transferred to the conveyor before a pallet change is made so that connectors may remain available while the pallet is changed.

Some embodiments may include a set of magazines, where each magazine is able to accommodate multiple cones. For instance, some embodiments may include a magazine associated with each cone changer. In some embodiments, each platform 105 and/or support 145 may include pallets, conveyors, and/or magazines.

Figure 2:
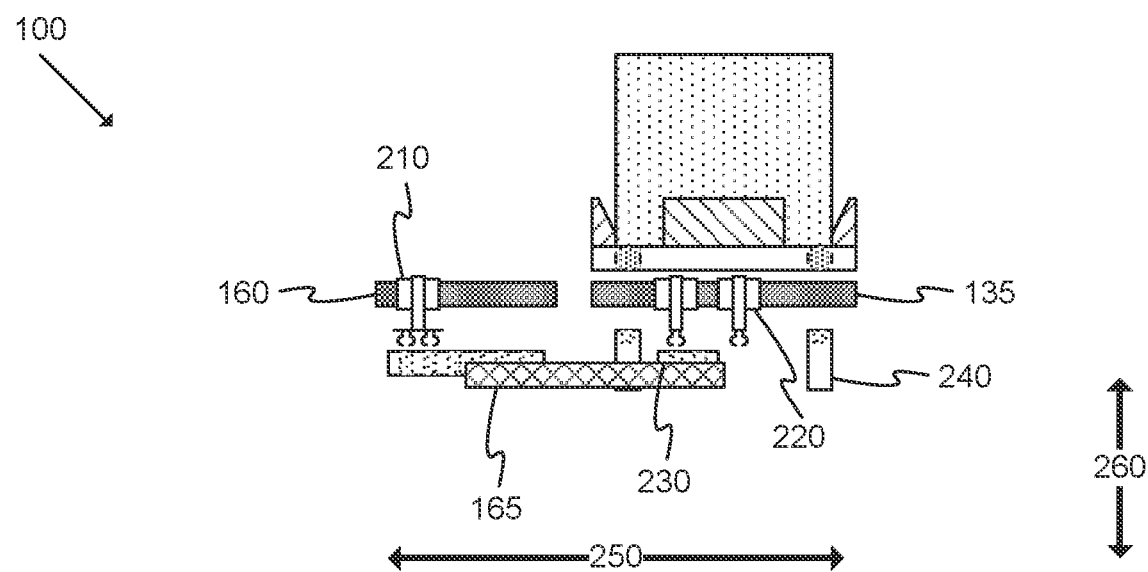
FIG. 2 illustrates a side elevation view of the container handling system of FIG. 1.

FIG. 2 illustrates a side elevation view of container handling system 100. For clarity, various obstructing support elements (e.g., frames, beams, joists, etc.) have been omitted. As shown, gantry 160 may be associated with a handler 210, gantry 135 may be associated with two handlers 220, and shuttle 165 may be associated with a transport 230. In addition, system 100 may include a set of connector changers 240. A second axis 250 may be associated with a movement path of the handlers 210 and 220 and transport 230. A third axis 260 may be associated with an additional movement path of the handlers 210 and 220.

Handler 210 may be able to move along gantry 160 parallel to axis 250. In addition, at least a portion of the handler 210 may be able to move parallel to axis 260. The handler 210 may include two grippers, where each gripper is able to retrieve, secure and transport, and/or release a connector, as appropriate. Each gripper may include a set of protruding arms or other elements that may be manipulated to secure or release a connector. Alternatively, grippers may utilize magnetic elements, suction, and/or other appropriate elements to interact with connectors.

Handler 220 may be able to move along gantry 135 parallel to axis 250. In addition, at least a portion of the handler 220 may be able to move parallel to axis 260. Each handler 220 may include one gripper.

Transport 230 may be able to move along shuttle 165 parallel to axis 250. Each transport 230 may be able to hold two or more connectors, with receptacles placed such that the grippers of handler 210 are able to deposit or retrieve two connectors simultaneously.

Each connector changer 240 may be able to receive one connector. The connector changer may be able to move along axis 170 in order to align with a desired position within access hole 125 (e.g., to accommodate different sized containers with differing receptacle locations). The connector changer 240 may also be able to be positioned in various other appropriate ways. In addition, each connector changer may be able to move along axis 260 when connecting or disconnecting a cone from a container 130. Each changer 240 may be able to manipulate a cone such that the cone is able to be attached to a container 130 or detached from a container (e.g., by rotating or twisting to engage the cone with the container and rotating or twisting in an opposite direction to disengage the cone from the container).

In some embodiments, robotic arms may be used in conjunction with and/or in place of various elements described above. Such robotic arms may be able to move along multiple axes within a multi-dimensional space. Each robotic arm may include one or more pivoting elements, rotating elements, and/or other appropriate movement elements. The arms may be move along a set of vectors that define a movement path. Such vectors and paths may be defined using Cartesian coordinates. Each arm may include various associated grippers and/or other appropriate elements that may allow the arms to grasp, manipulate, and/or place cones.

In some embodiments a robotic arm may be associated with each changer and may be used to retrieve cones from a gantry, handler, receptacle, etc. and supply the cone to the changer (or vice-versa when retrieving a cone from the changer). As another example, each gantry associated with a pallet may include one or more robotic arms that are able to retrieve cones from the pallet receptacles (or place cones in the receptacles).

Figure 3:
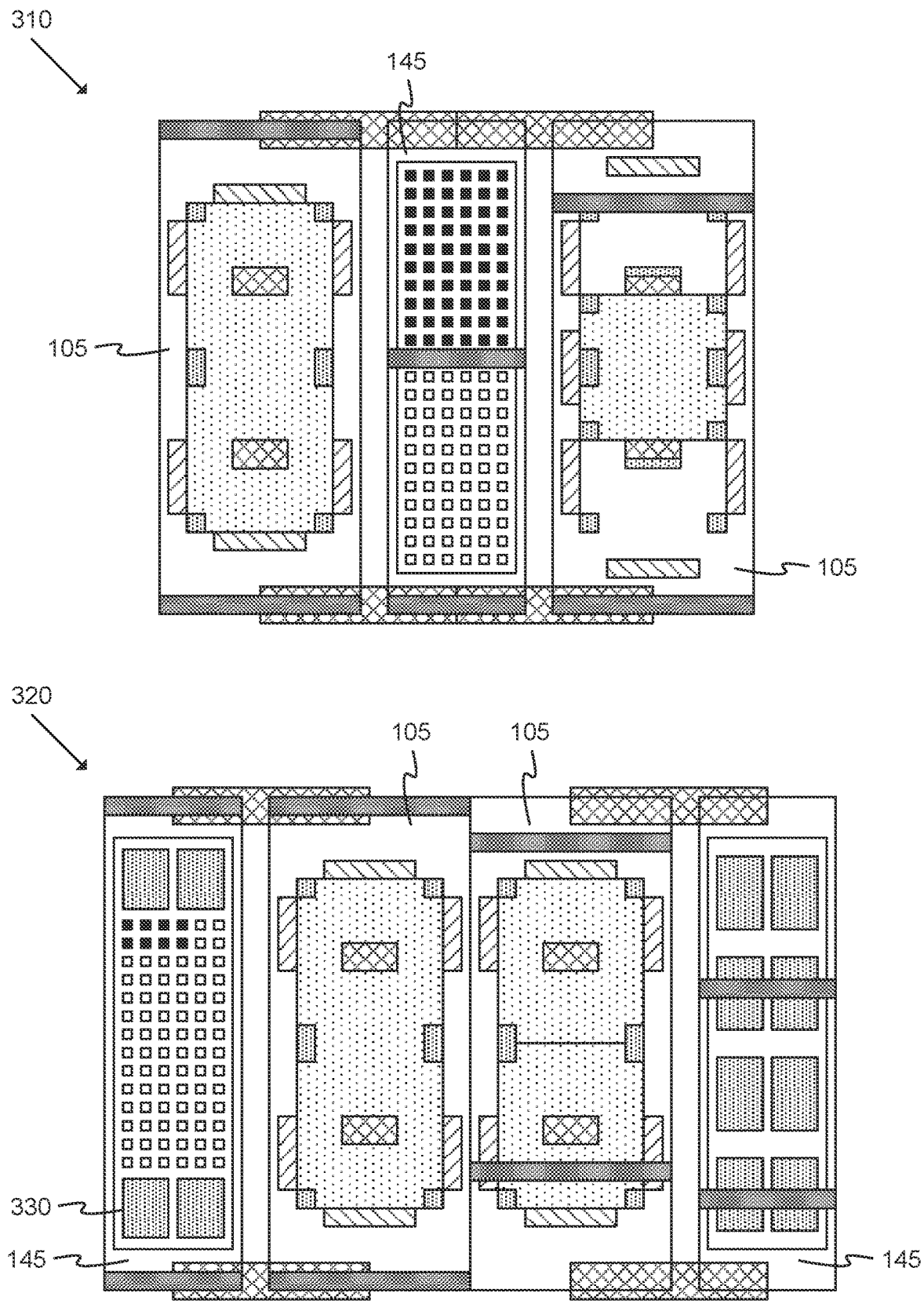
FIG. 3 illustrates top views of alternative container handling systems according to exemplary embodiments.

FIG. 3 illustrates top views of alternative container handling systems 310 and 320 according to exemplary embodiments. One of ordinary skill in the art will recognize that these systems are provided for example purposes and that various other configurations may be provided by other embodiments. Such systems may be able to be retrofitted to existing cranes and platforms. In addition, such systems may be utilized for manufacture of new crane systems.

As shown, the first example system 310 includes two platforms 105 placed on either side of a pallet station 145. Such a configuration may allow for increased efficiency and/or retrofitting to existing container handling stations. In this example, the platform 105 on the right has a smaller container 130 than the platform 105 to the left. As such, the guides 120 have been moved to an engaged position. The platform 105 to the right also includes a different hole 125 configuration and guide 110 configuration.

The second example system 320 includes two platforms 105, each associated with a pallet station 145. In this example, the pallet 150 at the left station 145 includes a number of bins 330 in addition to the receptacles 155. Such a configuration may allow cones to be placed in the bins 330 for return to a vessel.

The platform 105 on the right in the example system 320 includes two containers 130 placed end-to-end. In addition, the pallet 150 on the right side includes multiple bins 330 and no receptacles 155. Such a configuration may allow all cones to be placed in the bins when not needed for container loading.

One of ordinary skill in the art will recognize that the physical elements described in reference to FIGS. 1-3 may be implemented in various different ways without departing from the spirit of the disclosure. For instance, different embodiments may have elements of differing size, shape, orientation, etc. than shown. As another example, different embodiments may include different numbers of elements, additional elements, fewer elements, and/or different configurations of elements. In addition, for clarity, various structural support elements are omitted from the structures described above. For instance, each station may include a frame and various platforms. The station structure may support and link the platforms, pallet stations, shuttles, gantries and rails, etc. The various elements may be coupled in various appropriate ways (e.g., welds, fasteners, adhesives, etc.).

In some embodiments, each changer and/or handler may include a separate magazine or conveyor used to store connectors. Such magazines may have limited storage capabilities compared to pallets, but may allow each station section to function independently.

B. Hardware Architecture

Figure 4:
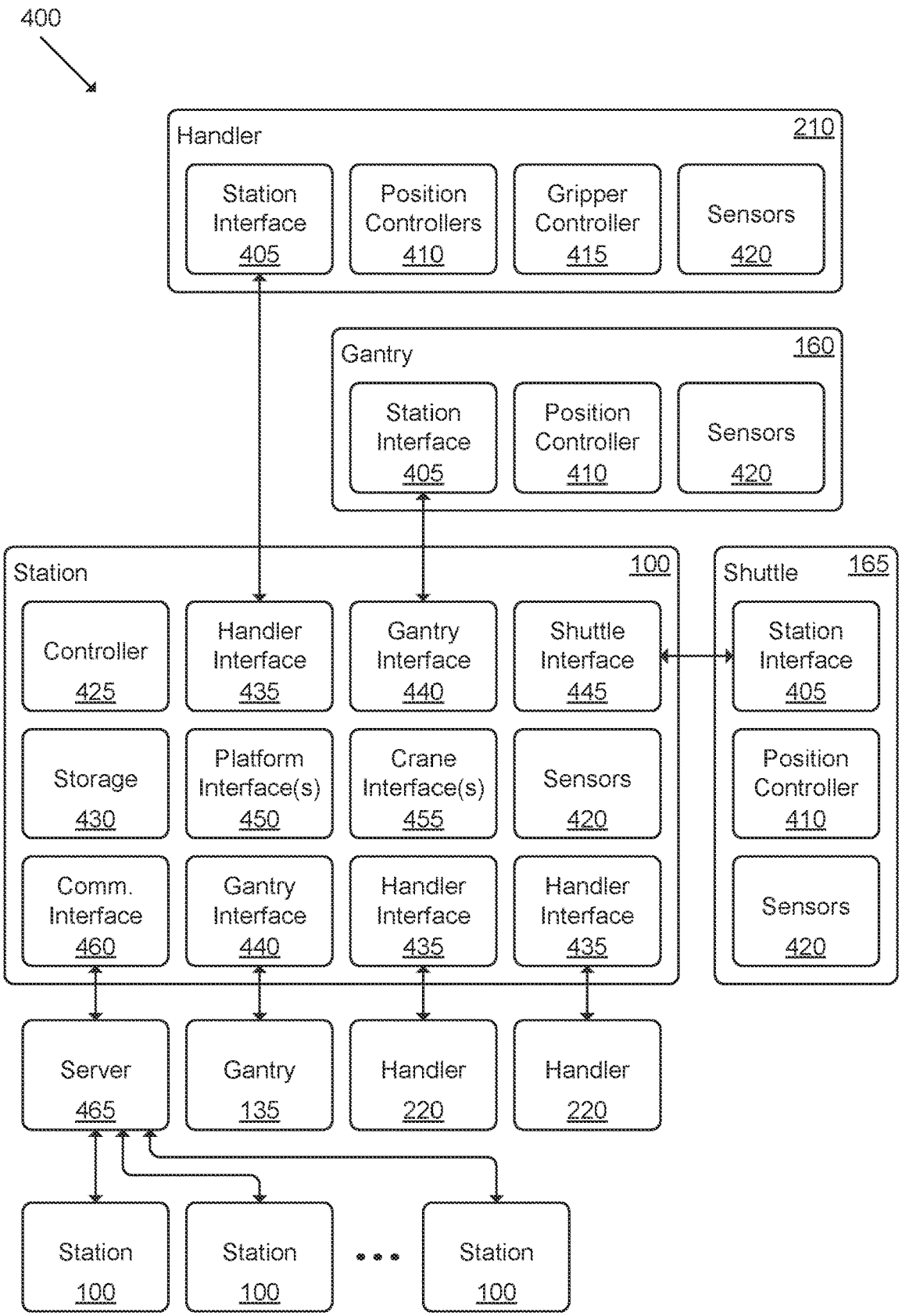
FIG. 4 illustrates a schematic block diagram of a container handling system according to an exemplary embodiment.

FIG. 4 illustrates a schematic block diagram of a container handling system 400 according to an exemplary embodiment. Such a system may be used with, for example, any of the physical configurations of FIGS. 1-3. As shown, the system may include a handler 210, a gantry 160, one or more station systems 100, a shuttle 165, gantry 135, and handlers 220.

Handler 210 (and handler 220) may include a station interface 405, a set of position controllers 410, a gripper controller 415, and a set of sensors 420. Gantry 160 (and gantry 135) may include a station interface 405, a position controller 410, and a set of sensors 420. The shuttle 165 may include a station interface 405, a position controller 410, and a set of sensors 420.

Each station interface 405 may be able to communicate with the appropriate element of station 100. Each interface 405 may be able to receive commands, generate and send data including sensed data, status, etc., and/or otherwise communicate with station 100.

Each position controller 410 may be able to control movement of the element along at least one axis. The controller may interface with various motors, hydraulic elements, etc. to position the element as desired.

Each gripper controller 415 may be able to control a gripper by causing the gripper to release, grasp, or secure a connector.

Each set of sensors 420 may include various types of sensor elements (and/or associated data) that may allow for manipulation of the associated system component. For instance, each handler 210 or 220 may include one or more cameras that may allow the handler to visually identify connectors in order to determine whether a receptacle is occupied. As another example, each handler may include various position sensors that are able to determine the handler position relative to a platform 105 or pallet station 145.

The station system 100 may include a controller 425, storage 430, a set of handler interfaces 435, a set of gantry interfaces 440, a set of shuttle interfaces 445, a set of platform interfaces 450, a set of crane interfaces 455, and a communication interface 460.

Controller 425 may be able to execute algorithms and/or manipulate data in order to at least partly control the operations of other system components. Although the controller is shown as being wholly included in the station 100, some embodiments may include multiple distributed controllers. For instance, some embodiments may include a controller at each platform 105, each pallet station 145, etc. In this way, if any controller is unavailable or malfunctioning, the other station elements may continue to operate independently. The controllers 425 may be able to communicate or otherwise interact as appropriate.

Storage 430 may be able to store data and/or instructions for use by controller 425 and/or other system elements.

Each handler interface 435 may be able to communicate with the handlers 210 and 220 via station interface 405. The station system 100 may thus be able to receive information from the handlers 0210 and 220 (e.g., position, status, etc.), and/or provide information and/or commands to the handlers (e.g., target position, gripper status, etc.).

Each gantry interface 440 may be able to communicate with the gantries 135 and 160 via station interface 405. The station system 100 may thus be able to receive information from the gantries 135 and 160 (e.g., position, status, etc.), and/or provide information and/or commands to the gantries (e.g., target position, handler status, etc.). In some embodiments, the station 100 may communicate with the gantries 135 and 160 which, in turn, communicate with any associated handlers 210 or 220.

Each shuttle interface 445 may be able to communicate with the shuttle 165 via station interface 405. The station system 100 may thus be able to receive information from the shuttle 165 (e.g., position, status, etc.), and/or provide information and/or commands to the shuttle (e.g., target position, transport status, etc.).

The platform interface(s) 450 may allow the station 100 to interact with the platform elements, appropriate. For instance, guides, clamps, etc. may be at least partially controlled via the platform interface 450. Likewise, status, position, etc. of the guides, clamps, changers, and/or other platform elements may be received via the platform interface(s).

The crane interface(s) 455 may allow the station 100 to interact with various other shipping yard or station elements. For instance, a crane associated with a handling station 100 may be at least partly controlled by interface 455. As another example, the interface may be able to receive information from cranes or other elements (e.g., container available, crane status, etc.). In addition to or in place of cranes, other external elements such as pallet loaders (e.g., lifts, trucks, etc.) may be at least partly controlled by interface 455. Likewise, the interface 455 may be able to retrieve and/or receive instructions, messages, commands, status, etc. from the various external elements. In this way, station 100 may interact with various other components of the shipping yard to further automate container handling.

Communication interface 460 may allow the station 100 to interact with various local and/or remote servers 465. Such servers may be accessible across one or more networks. In some cases, a server may control multiple stations 100 associated with a shipping yard. Such a configuration may allow for improved efficiency in managing resources (e.g., pallets, pallet loaders, cranes, etc.) that may be utilized by multiple stations.

One of ordinary skill in the art will recognize that system 400 may be implemented in various different ways without departing from the spirit of the disclosure. For instance, different embodiments may include different numbers of elements, different communication pathways among elements, etc.

Methods of Operation

A. Container Loading

Figure 5:
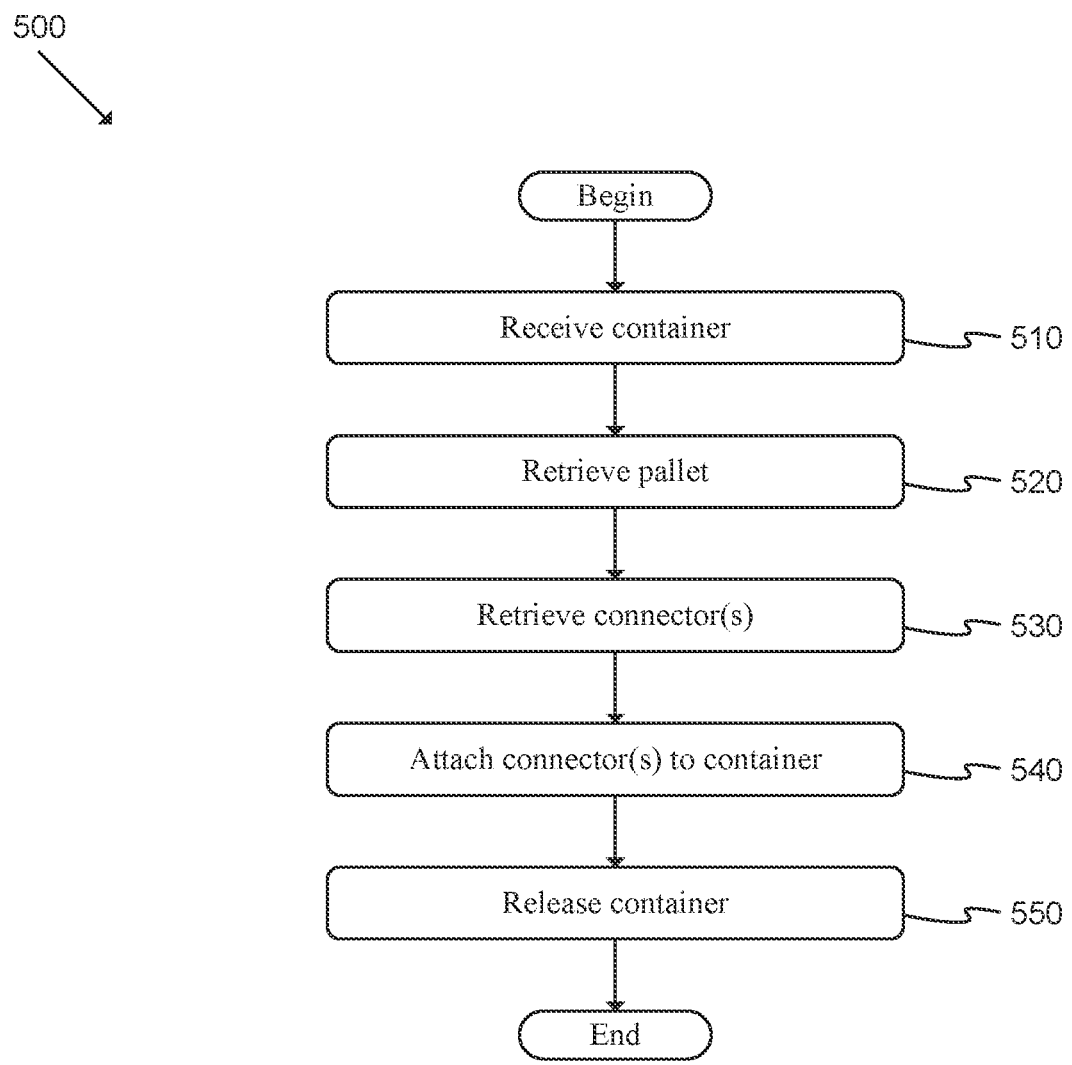
FIG. 5 illustrates a flow chart of an exemplary process used by some embodiments to load a shipping container.

FIG. 5 illustrates a flow chart of an exemplary process 500 used by some embodiments to load a shipping container. Such a process may begin, for instance, when a container is made available to a system of some embodiments (e.g., when a container has been hoisted into position by a crane or other appropriate apparatus).

As shown, the process may receive (at 510) the container (e.g., by providing guides to steer the container into a desired position). Such a position may place the container such that various features of the container are aligned with various features of the attachment/detachment system. The container may be secured in place using clamps or other appropriate features.

The process may then retrieve (at 520) a pallet or other connector storage element. Such retrieval may involve requesting a pallet from another system resource, loading a pallet from a pallet handler, etc.

Next, the process may retrieve (at 530) a set of connectors to be attached to the container. Alternatively, the connectors may be retrieved before the container is positioned if the container configuration is known. Such connectors may be retrieved from a storage element such as a rack, pallet, magazine, or other appropriate element using an automated handler of some embodiments.

The process may then attach (at 540) the connectors to the container. Such connectors may be attached in various appropriate ways. For instance, each connector may be delivered by the automated handler to a connection/disconnection element that is positioned in an appropriate location relative to a connector receptacle of the container. The connection element may then insert the connector into the receptacle and secure the connector in place (e.g., by twisting the connector or otherwise adjusting the connector position such that the connector is securely coupled to the container).

Next, the process may release (at 550) the container and then end. Such release may involve one or more mechanical releases (e.g., releasing clamps or other securing features) and/or virtual releases (e.g., sending a release message to a central controller or other appropriate element).

Figure 6:
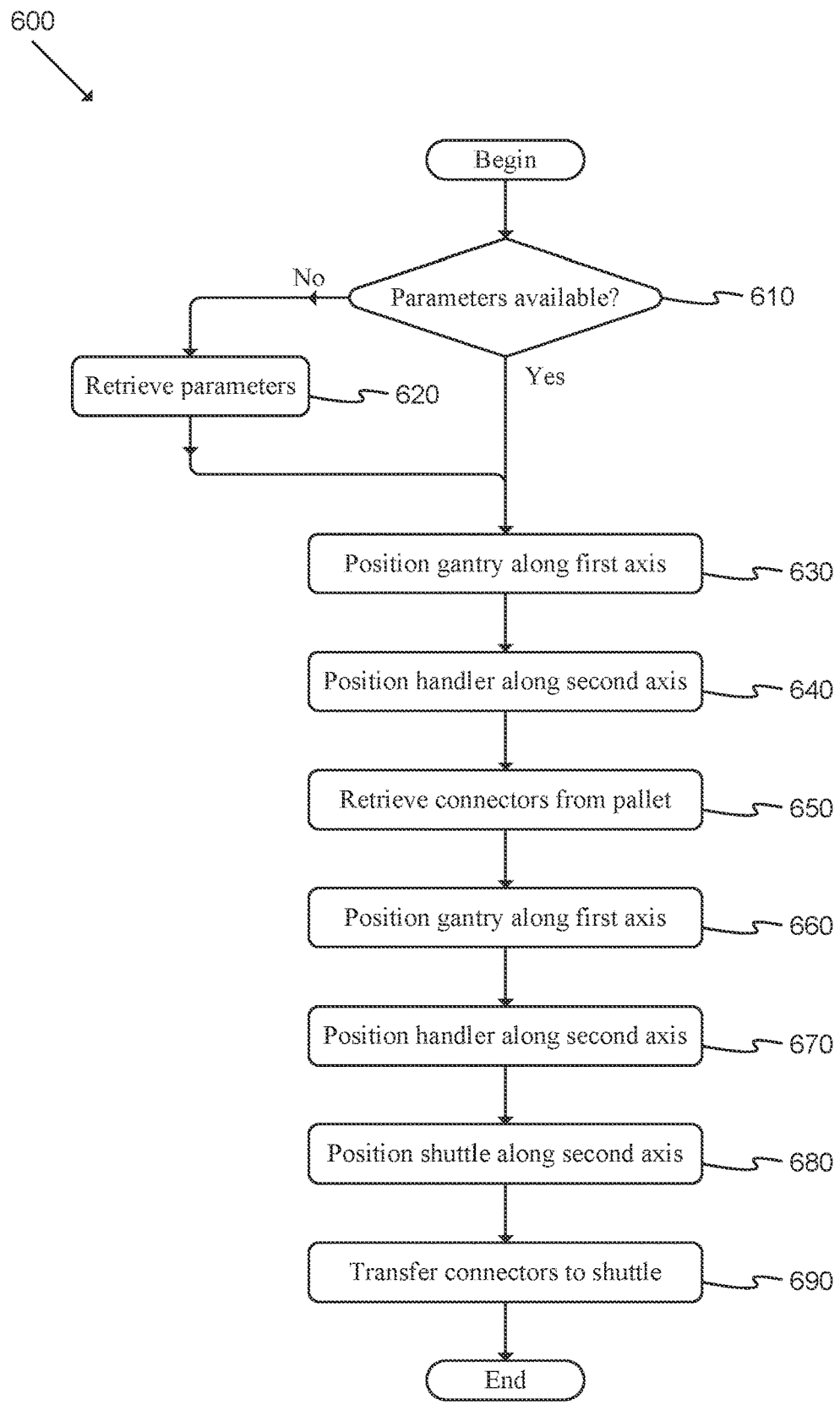
FIG. 6 illustrates a flow chart of an exemplary process used by some embodiments to retrieve connectors from a pallet.
Figure 7:
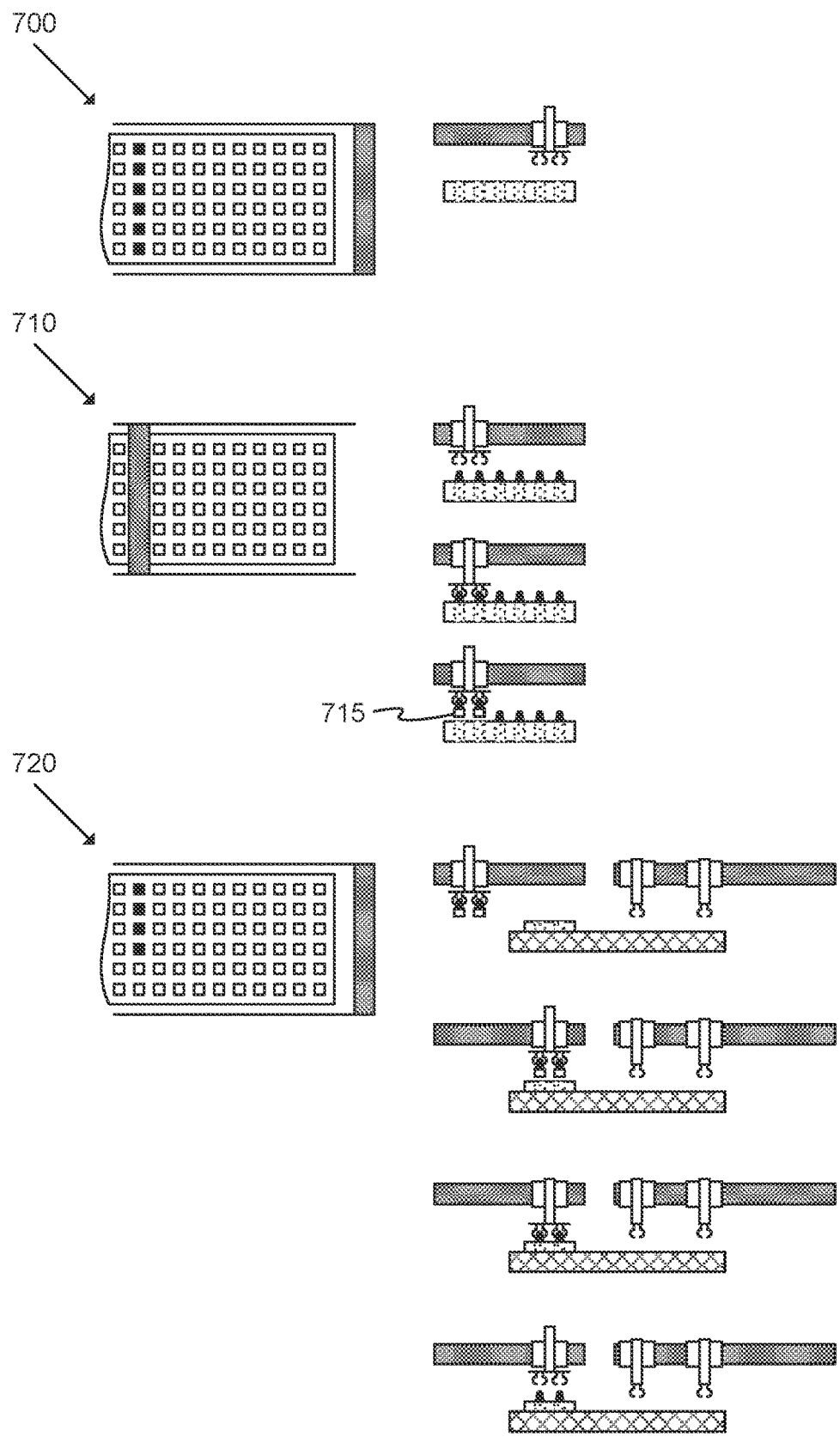
FIG. 7 illustrates top and side views of a container handling system during retrieval of connectors from a pallet.

FIG. 6 illustrates a flow chart of an exemplary process 600 used by some embodiments to retrieve connectors from a pallet. Such a process may begin, for instance, when a container is loaded to a station. Process 600 will be described by reference to FIG. 7, which illustrates top and side views of a container handling system during retrieval of connectors from a pallet.

As shown, process 600 may determine (at 610) whether operating parameters are available or known. Such parameters may include, for instance, status and/or position of pallets, gantries, and/or handlers, type of container, availability of connector receptacles, etc. If the process determines (at 610) that the operating parameters are not available, the process may retrieve (at 620) or determine the necessary parameters. Such parameters may be retrieved by querying an appropriate resource (e.g., a station controller or server). Alternatively, the parameters may be obtained by polling and/or manipulating components (e.g., by requesting position information, by directing a handler to scan a pallet using a camera to determine a next available location, etc.).

Next, the process may position (at 630) the gantry along the first axis. Example 700 shows the gantry at an initial or default position. Example 710 shows the gantry moved to a position along the first axis that is associated with a column of available connectors.

The process then may position (at 640) the handler along the second axis. Example 710 shows the handler moved from the default position of example 700. The process may then retrieve (at 650) connectors from the pallet. As shown in example 710, the handler may lower the grippers, grasp the connectors 715, and raise the grippers so that the connectors are free of the pallet.

Next, the process may position (at 660) the gantry along the first axis. As shown in example 720, the gantry may move back to a position past the edge of the pallet and aligned with the shuttle. Next, the process may position (at 670) the handler along the second axis and transfer (at 690) the connectors to the shuttle transport and then may end. As shown in example 720, the handler may move along the second axis to a position over the transport. The handler may then lower the grippers and release the connectors to the transport.

Figure 8:
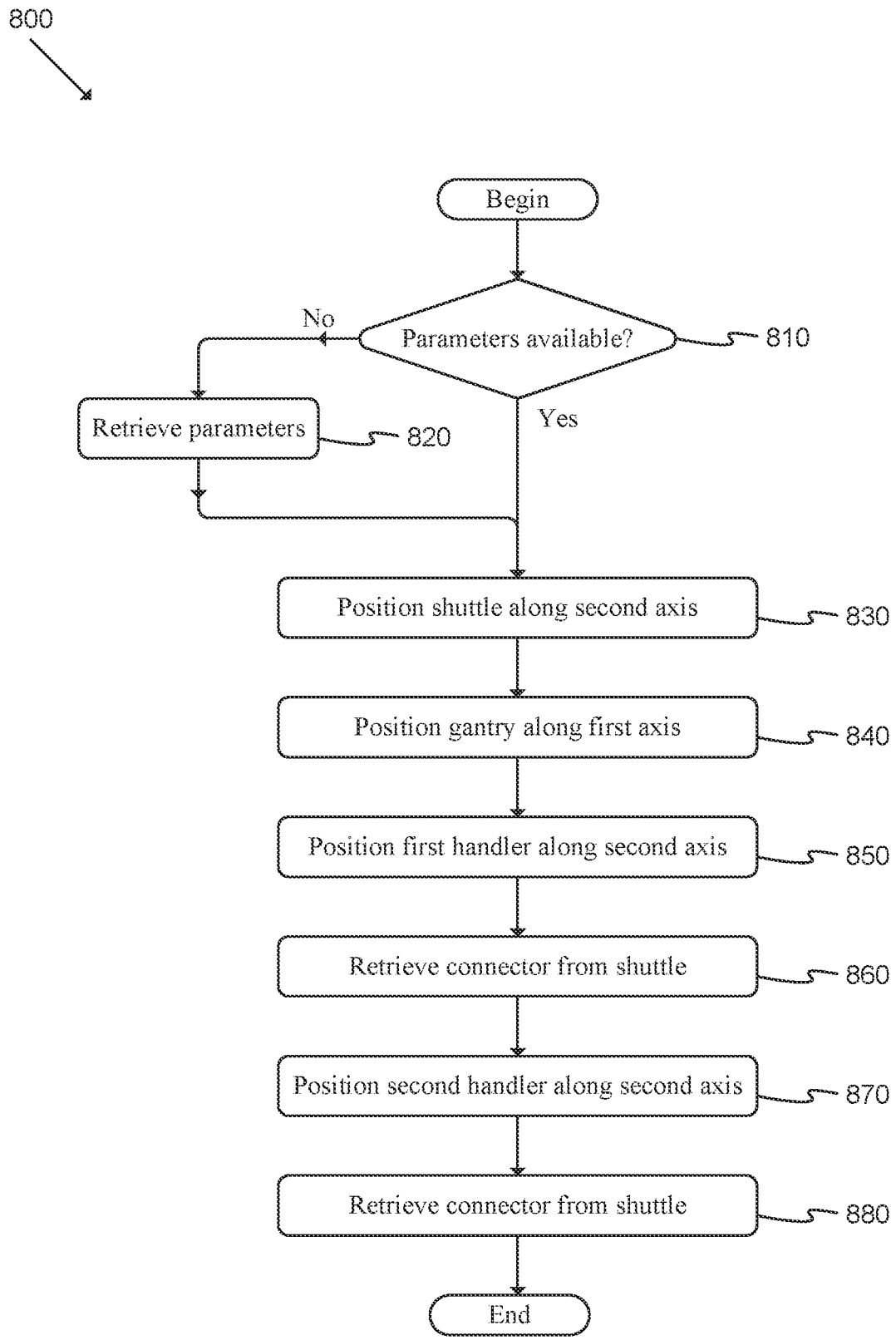
FIG. 8 illustrates a flow chart of an exemplary process used by some embodiments to retrieve connectors from a shuttle.
Figure 9:
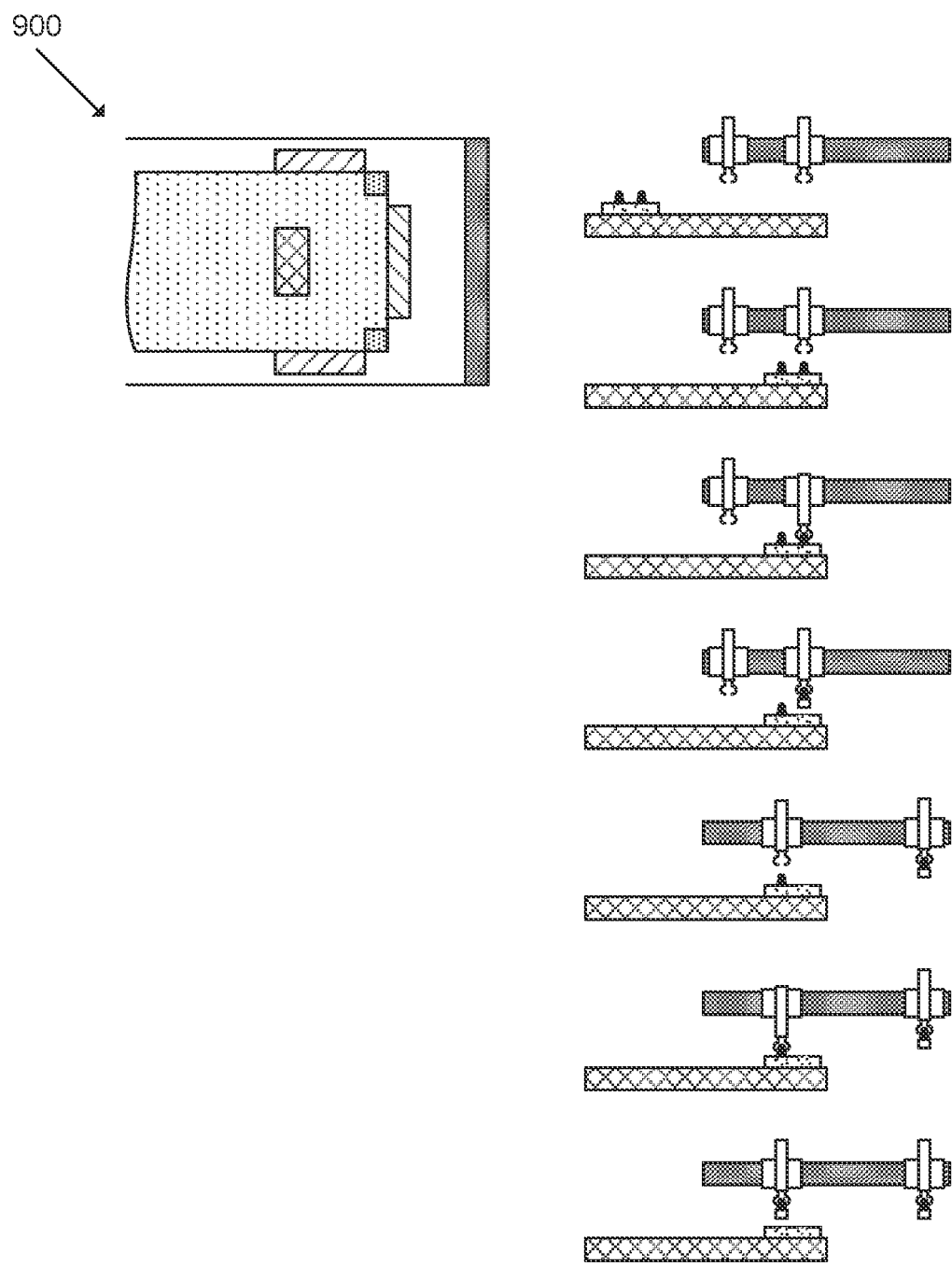
FIG. 9 illustrates top and side views of a container handling system during retrieval of connectors from a shuttle.

FIG. 8 illustrates a flow chart of an exemplary process 800 used by some embodiments to retrieve connectors from a shuttle. Such a process may begin, for instance, after connectors have been placed in the shuttle transport using a process such as process 600. Process 800 will be described by reference to FIG. 9, which illustrates top and side views of a container handling system during retrieval of connectors from a shuttle.

As shown, process 800 may determine (at 810) whether operating parameters are available or known. Such parameters may include, for instance, status and/or position of shuttles, gantries, and/or handlers, type of container, availability of connector receptacles, etc. If the process determines (at 810) that the operating parameters are not available, the process may retrieve (at 820) or determine the necessary parameters. Such parameters may be retrieved by querying an appropriate resource (e.g., a station controller or server). Alternatively, the parameters may be obtained by polling and/or manipulating components (e.g., by requesting position information, by directing a shuttle to scan a transport receptacle, etc.).

Next, the process may position (at 830) the shuttle transport along the second axis. Such an operation is shown in example 900 as the transport moves from left to right. The process may then position (at 840) the gantry along the first axis such that the gantry is over a portion of the shuttle.

The process may then position (at 850) a first handler along the second axis and retrieve (at 860) a connector from the shuttle transport. The connector may be retrieved by lowering the gripper of the first handler, grasping the connector, and raising the gripper as shown in example 900. The first handler may then be positioned along the second axis so as not to interfere with the second handler (and/or to align with a changer).

Next, the process may position (at 870) the second handler along the second axis, retrieve (at 880) the other connector from the shuttle transport and then may end. As shown in example 900, the connector may be retrieved by lowering the gripper of the first handler, grasping the connector, and raising the gripper. The second handler may then be positioned along the second axis to align with a changer.

Figure 10:
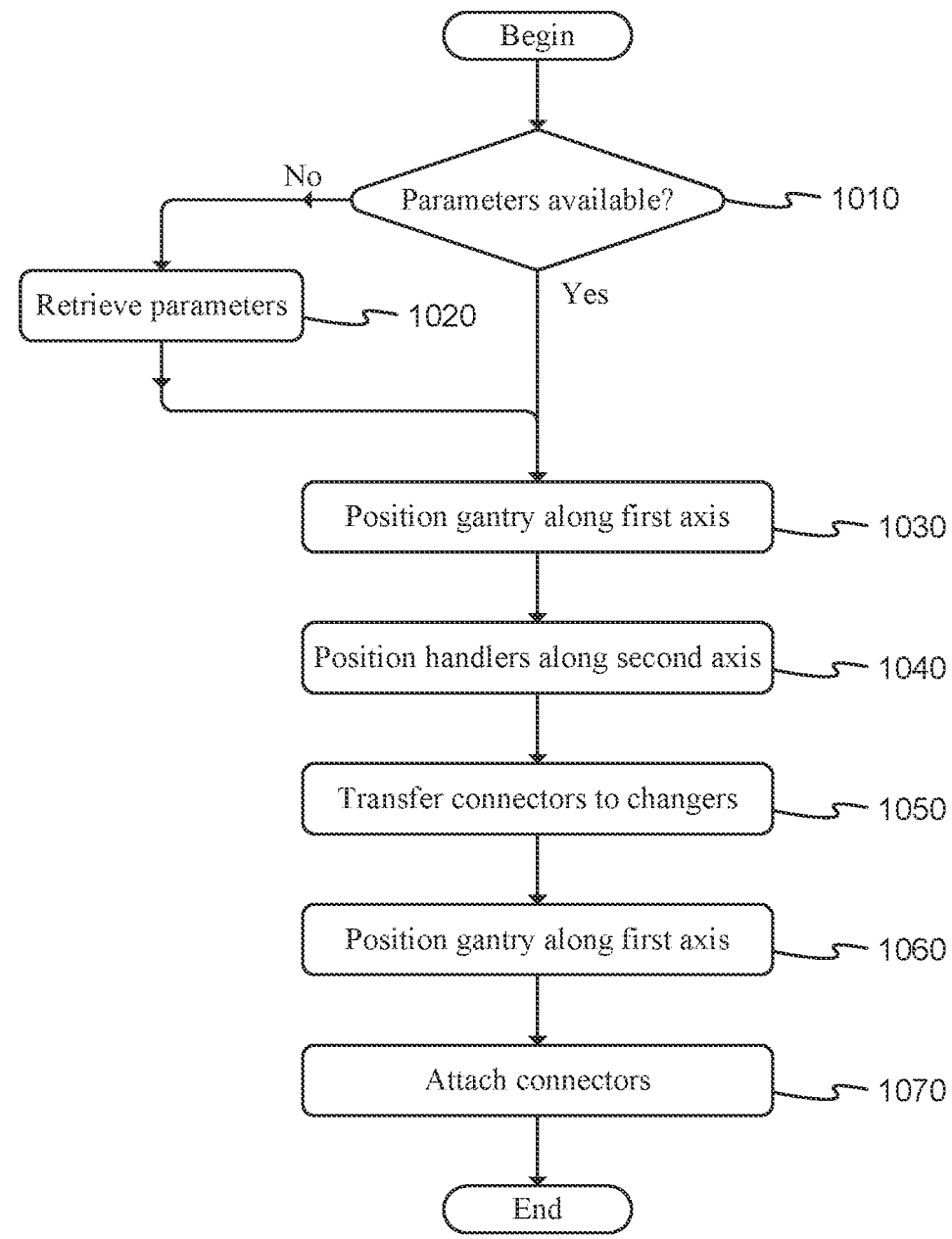
FIG. 10 illustrates a flow chart of an exemplary process used by some embodiments to attach connectors to a container.
Figure 11:
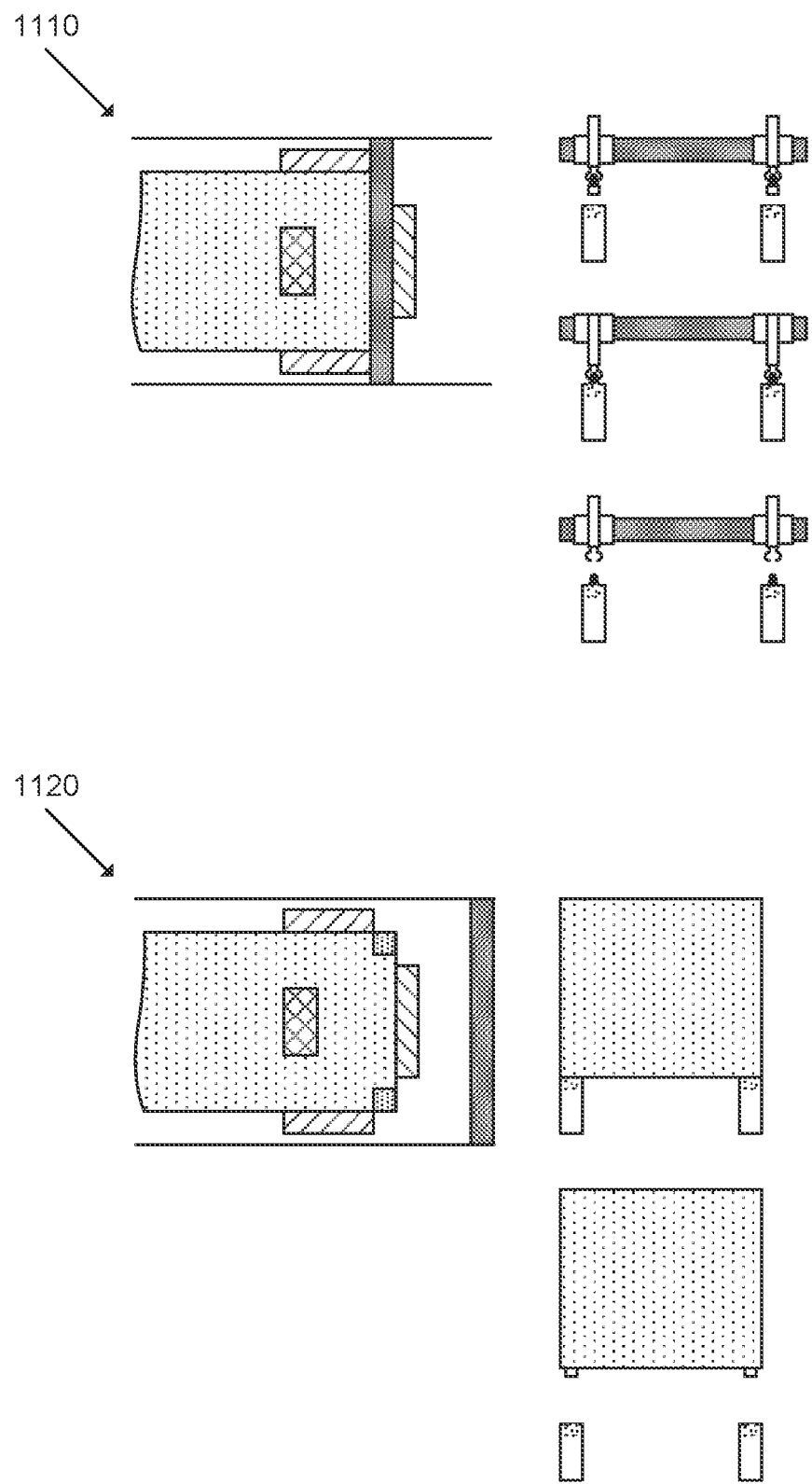
FIG. 11 illustrates top and side views of a container handling system during attachment of connectors to a container.

FIG. 10 illustrates a flow chart of an exemplary process 1000 used by some embodiments to attach connectors to a container. Such a process may begin, for instance, after connectors have been retrieved from the shuttle transport using a process such as process 800. Process 1000 will be described by reference to FIG. 11, which illustrates top and side views of a container handling system during attachment of connectors to a container.

As shown, process 1000 may determine (at 1010) whether operating parameters are available or known. Such parameters may include, for instance, status and/or position of changers, gantries, and/or handlers, type of container, availability of connector receptacles, etc. If the process determines (at 1010) that the operating parameters are not available, the process may retrieve (at 1020) or determine the necessary parameters. Such parameters may be retrieved by querying an appropriate resource (e.g., a station controller or server). Alternatively, the parameters may be obtained by polling and/or manipulating components (e.g., by requesting position information, by directing a changer to scan a container using a camera to determine a next available location, etc.).

Next, the process may position (at 1030) the gantry along the first axis and position (at 1040) handlers along the second axis. Such a state is shown in example 1110. The process may then transfer (at 1050) the connectors to the changers. Such an operation is shown in example 1110, where the grippers are lowered over the changes and the connectors are released into the changer receptacles.

The process may then position (at 1060) the gantry along the first axis such that the gantry will not interfere with the movement of the changers as shown in example 1120. Next, the process may attach (at 1070) the connectors to the container by raising the changers (and connectors) and twisting (and/or otherwise manipulating) the connectors such that the connectors are secured to the container. The process may then end.

B. Container Unloading

Figure 12:
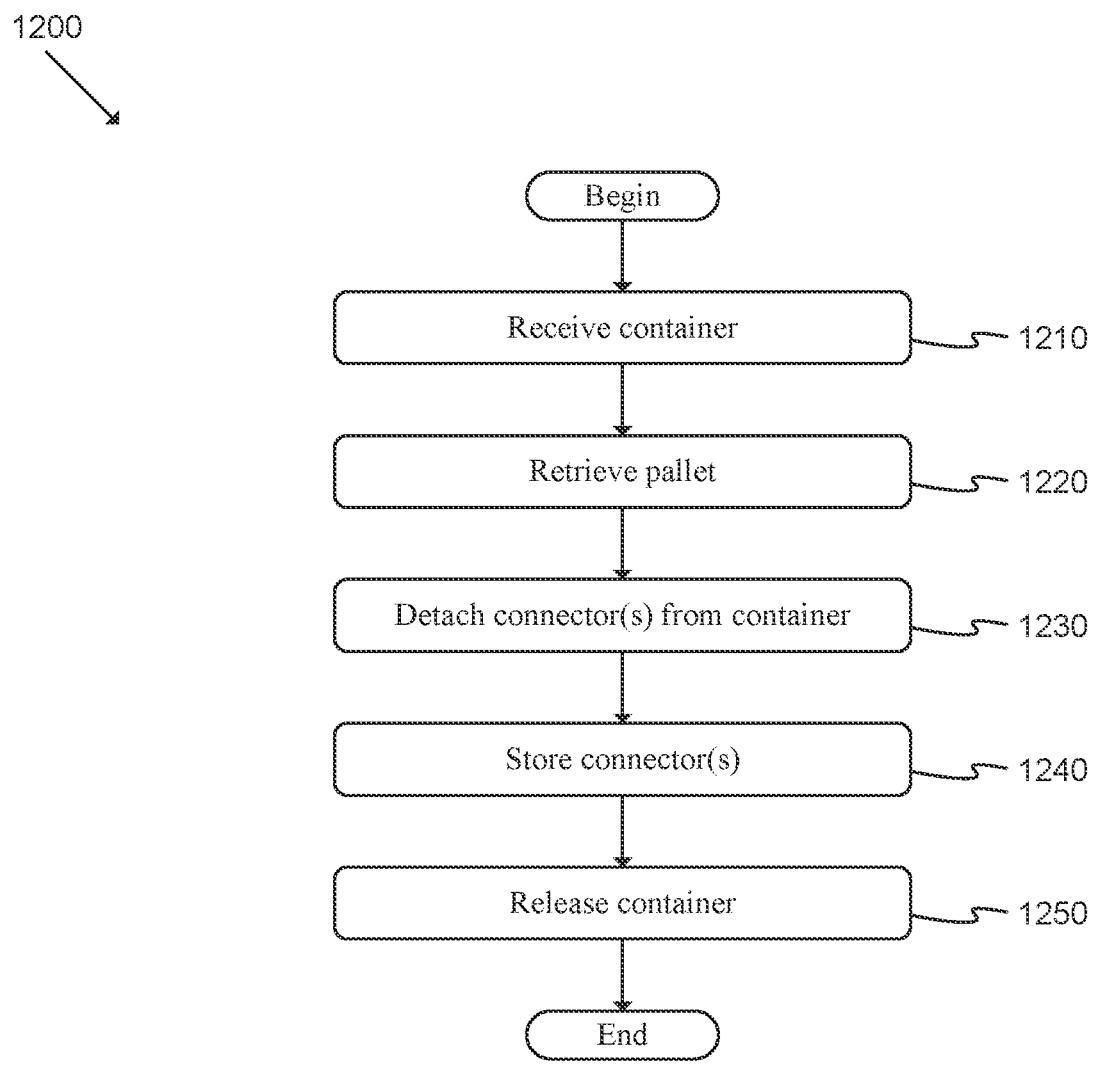
FIG. 12 illustrates a flow chart of an exemplary process used by some embodiments to unload a shipping container.

FIG. 12 illustrates a flow chart of an exemplary process 1200 used by some embodiments to unload a shipping container. Such a process may begin, for instance, when a container is made available to an attachment/detachment feature of some embodiments (e.g., when a container has been hoisted into position by a crane or other appropriate apparatus).

As shown, the process may receive (at 1210) the container (e.g., by providing guides to steer the container into a desired position). Such a position may place the container such that various features of the container are aligned with various features of the attachment/detachment feature. The container may be secured in place using clamps or other appropriate features.

The process may then retrieve (at 1220) a pallet or other storage element. Next, the process may detach (at 1230) a set of connectors from the container. Such connectors may be detached in various appropriate ways. For instance, each connector may be retrieved by a connection/disconnection element that is positioned in an appropriate location relative to a connector receptacle of the container. The disconnection element may then release the connector (e.g., by twisting the connector or otherwise adjusting the connector position such that the connector is released from the container receptacle) and removing the connector from the receptacle.

Next, the process may store (at 1240) the connectors. Such connectors may be stored by retrieving the connectors from the disconnection element using an automated handler and placing the connectors in a rack, bin, pallet, magazine, or other appropriate storage element.

Next, the process may release (at 1250) the container and then end. Such release may involve one or more mechanical releases (e.g., releasing clamps or other securing features) and/or virtual releases (e.g., sending a release message to a central controller).

Figure 13:
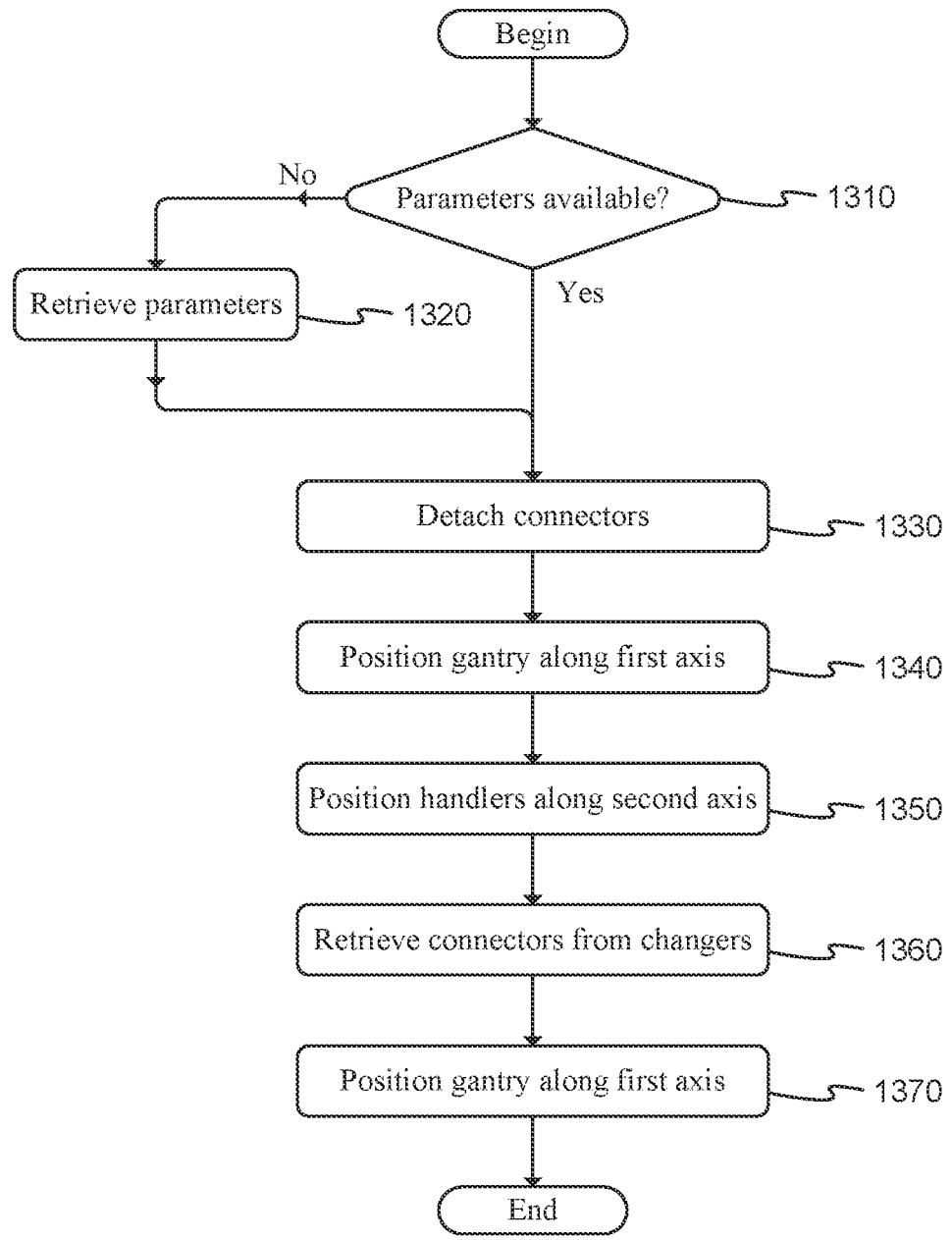
FIG. 13 illustrates a flow chart of an exemplary process used by some embodiments to detach connectors from a container.

FIG. 13 illustrates a flow chart of an exemplary process 1300 used by some embodiments to detach connectors from a container. Such a process may begin, for instance, when a container is made available to an attachment/detachment feature of some embodiments (e.g., when a container has been hoisted into position by a crane or other appropriate apparatus). Process 1300 may be considered a complement to process 1000 and may be better understood by reference to FIG. 11.

As shown, process 1300 may determine (at 1310) whether operating parameters are available or known. Such parameters may include, for instance, status and/or position of changers, gantries, and/or handlers, type of container, availability of connector receptacles, etc. If the process determines (at 1310) that the operating parameters are not available, the process may retrieve (at 1320) or determine the necessary parameters. Such parameters may be retrieved by querying an appropriate resource (e.g., a station controller or server). Alternatively, the parameters may be obtained by polling and/or manipulating components (e.g., by requesting position information, by directing a changer to scan a container using a camera to determine whether a location is occupied, etc.).

Next, the process may detach (at 1330) the connectors from the container. The process may then position (at 1340) the gantry along the first axis such that the gantry is aligned with the changers.

The process may then position (at 1350) the handlers along the second axis and retrieve (at 1360) the connectors from the changers. Next, the process may position (at 1370) the gantry along the first axis such that the gantry is aligned with the shuttle and then may end.

Figure 14:
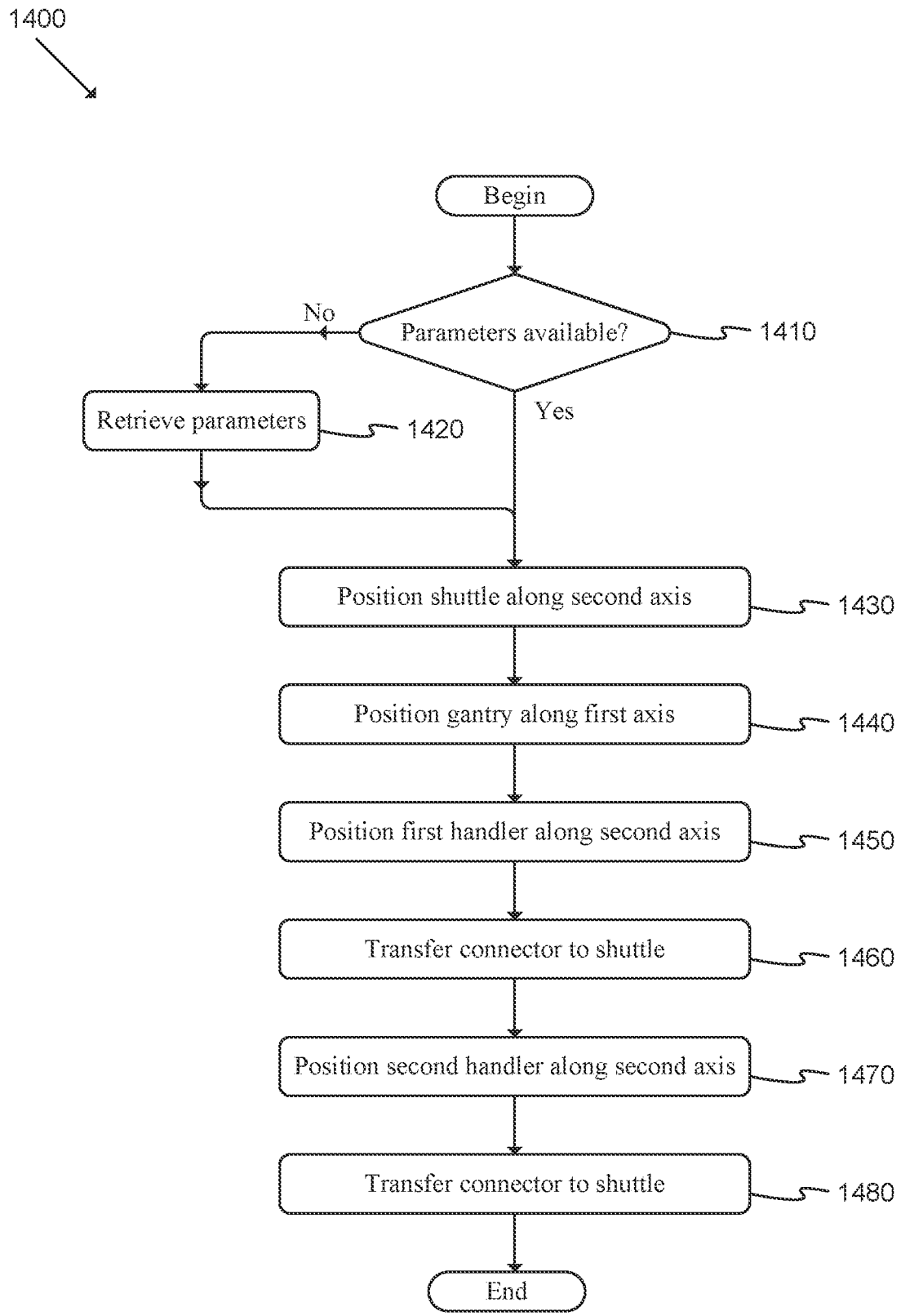
FIG. 14 illustrates a flow chart of an exemplary process used by some embodiments to transfer connectors to a shuttle.

FIG. 14 illustrates a flow chart of an exemplary process 1400 used by some embodiments to transfer connectors to a shuttle. Such a process may begin, for instance, after connectors have been removed from a container using a process such as process 1300. Process 1400 may be considered a complement to process 800 and may be better understood by reference to FIG. 9.

As shown, process 1400 may determine (at 1410) whether operating parameters are available or known. Such parameters may include, for instance, status and/or position of shuttles, gantries, and/or handlers, type of container, availability of connector receptacles, etc. If the process determines (at 1410) that the operating parameters are not available, the process may retrieve (at 1420) or determine the necessary parameters. Such parameters may be retrieved by querying an appropriate resource (e.g., a station controller or server). Alternatively, the parameters may be obtained by polling and/or manipulating components (e.g., by requesting position information, by directing a shuttle to scan a transport receptacle, etc.).

Next, the process may position (at 1430) the shuttle along the second axis such that the transport is available to the pallet gantry. The process may then position (at 1440) the gantry along the first axis, position (at 1450) the first handler along the second axis, and transfer (at 1460) the connector to the shuttle transport.

Process 1400 may then position (at 1470) the second handler along the second axis, transfer (at 1480) the connector to the transport and then may end.

Figure 15:
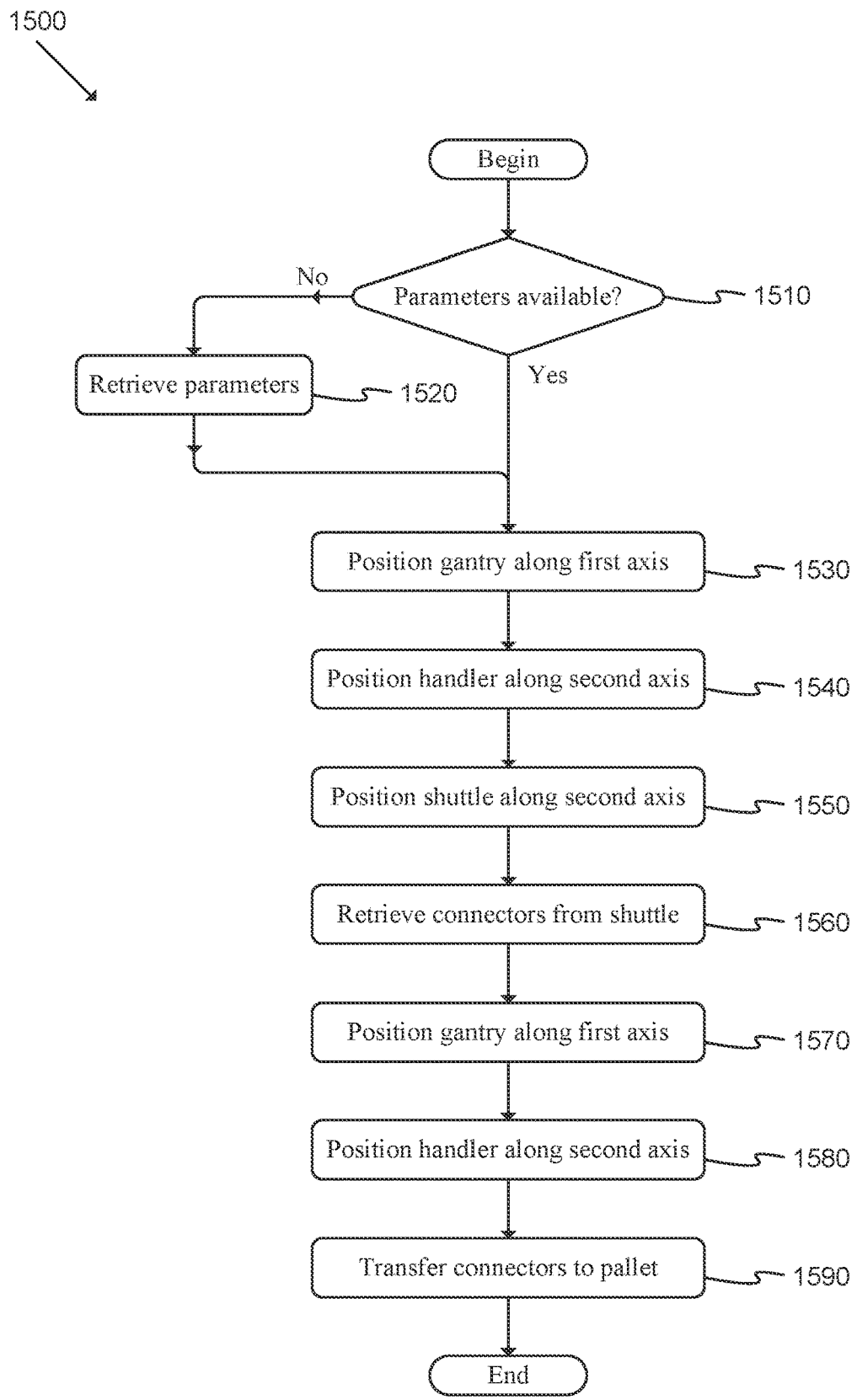
FIG. 15 illustrates a flow chart of an exemplary process used by some embodiments to transfer connectors to a pallet.

FIG. 15 illustrates a flow chart of an exemplary process 1500 used by some embodiments to transfer connectors to a pallet. Such a process may begin, for instance, after connectors have been retrieved from a shuttle using a process such as process 1400. Process 1500 may be considered a complement to process 600 and may be better understood by reference to FIG. 7.

As shown, process 1500 may determine (at 1510) whether operating parameters are available or known. Such parameters may include, for instance, status and/or position of pallets, gantries, and/or handlers, type of container, availability of connector receptacles, etc. If the process determines (at 1510) that the operating parameters are not available, the process may retrieve (at 1520) or determine the necessary parameters. Such parameters may be retrieved by querying an appropriate resource (e.g., a station controller or server). Alternatively, the parameters may be obtained by polling and/or manipulating components (e.g., by requesting position information, by directing a handler to scan a pallet using a camera to determine a next available location, etc.).

Next, the process may position (at 1530) the gantry along the first axis such that the gantry is aligned with the shuttle. The process may then position (at 1540) the handler along the second axis and position (at 1550) the shuttle transport along the second axis such that the handler and transport are aligned.

The process may then retrieve (at 1560) the connectors from the shuttle transport, position (at 1570) the gantry along the first axis, position (at 1580) the handler along the second axis, transfer (at 1590) the connectors to the pallet, and then may end.

The processes described above may be performed by systems such as those described above and below. Although the processes have been described by reference to a single container, similar processes may be implemented with sets of containers that may be coupled together in various appropriate ways. Such processes may be performed in various different ways without departing from the spirit of the disclosure. For instance, the operations may be performed in a different order. As another example, different additional operations may be included or described operations may be eliminated. In addition, such processes or portions thereof may be performed iteratively. Such processes may be divided into sub-processes or included as components of a macro-process.

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 16:
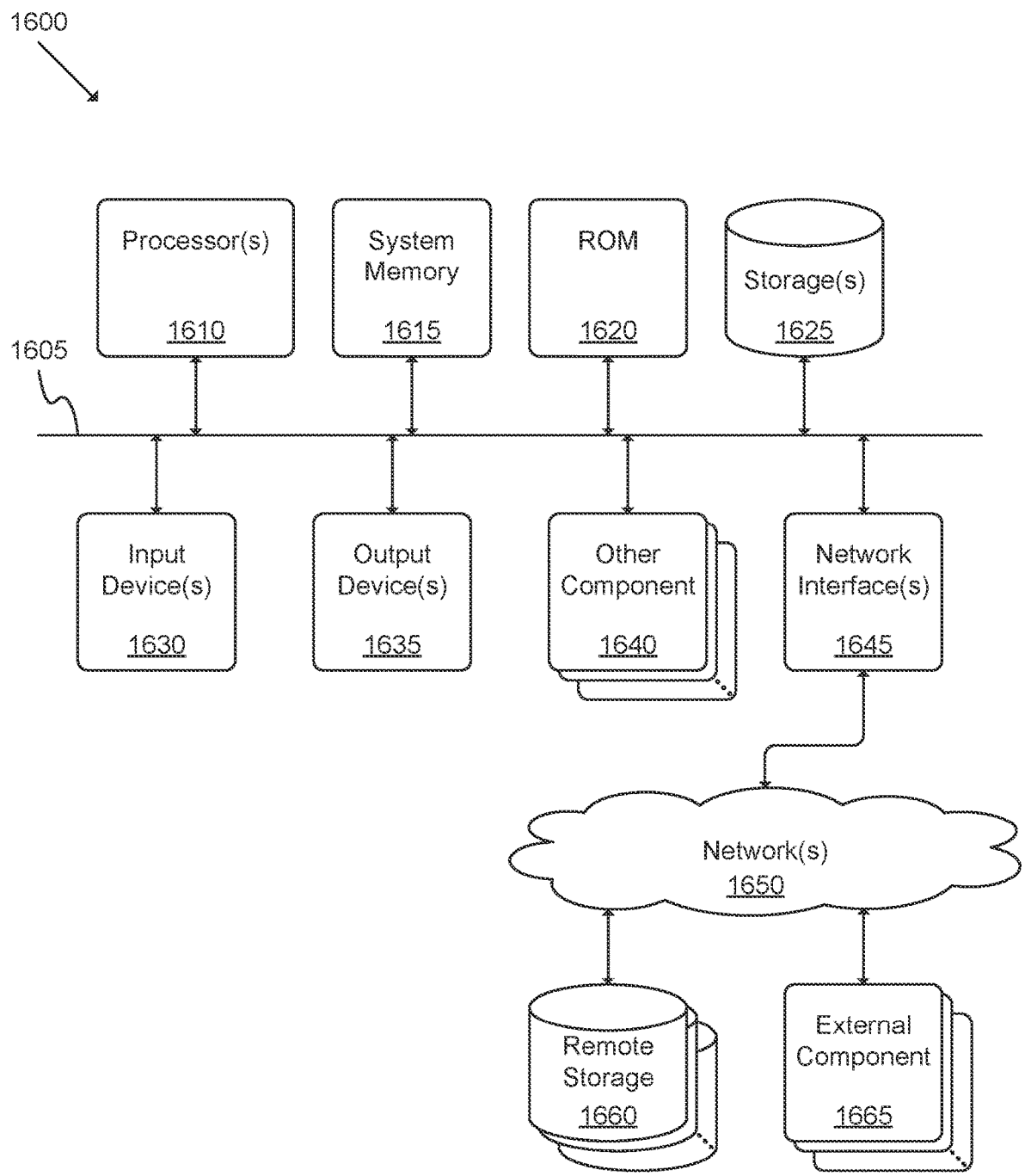
FIG. 16 illustrates a schematic block diagram of a conceptual computer system used to implement some embodiments.

FIG. 16 illustrates a schematic block diagram of a conceptual computer system 1600 used to implement some embodiments. For example, the system described above in reference to FIGS. 1-4 may be at least partially implemented using computer system 1600. As another example, the processes described in reference to FIGS. 5, 6, 8, 10, and 12-15 may be at least partially implemented using sets of instructions that are executed using computer system 1600.

Computer system 1600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1600 may include at least one communication bus 1605, one or more processors 1610, a system memory 1615, a read-only memory (ROM) 1620, permanent storage devices 1625, input devices 1630, output devices 1635, various other components 1640 (e.g., a graphics processing unit), and one or more network interfaces 1645.

Bus 1605 represents all communication pathways among the elements of computer system 1600. Such pathways may include wired, wireless, optical, and/or other appropriate communication pathways. For example, input devices 1630 and/or output devices 1635 may be coupled to the system 1600 using a wireless connection protocol or system.

The processor 1610 may, in order to execute the processes of some embodiments, retrieve instructions to execute and/or data to process from components such as system memory 1615, ROM 1620, and permanent storage device 1625. Such instructions and data may be passed over bus 1605.

System memory 1615 may be a volatile read-and-write memory, such as a random access memory (RAM). The system memory may store some of the instructions and data that the processor uses at runtime. The sets of instructions and/or data used to implement some embodiments may be stored in the system memory 1615, the permanent storage device 1625, and/or the read-only memory 1620. ROM 1620 may store static data and instructions that may be used by processor 1610 and/or other elements of the computer system.

Permanent storage device 1625 may be a read-and-write memory device. The permanent storage device may be a non-volatile memory unit that stores instructions and data even when computer system 1600 is off or unpowered. Computer system 1600 may use a removable storage device and/or a remote storage device as the permanent storage device.

Input devices 1630 may enable a user to communicate information to the computer system and/or manipulate various operations of the system. The input devices may include keyboards, cursor control devices, audio input devices and/or video input devices. Output devices 1635 may include printers, displays, and/or audio devices. Some or all of the input and/or output devices may be wirelessly or optically connected to the computer system.

Other components 1640 may perform various other functions. These functions may include performing specific functions (e.g., graphics processing, sound processing, etc.), providing storage, interfacing with external systems or components, etc.

Finally, as shown in FIG. 16, computer system 1600 may be coupled to one or more networks 1650 through one or more network interfaces 1645. For example, computer system 1600 may be coupled to a web server on the Internet such that a web browser executing on computer system 1600 may interact with the web server as a user interacts with an interface that operates in the web browser. Computer system 1600 may be able to access one or more remote storages 1660 and one or more external components 1665 through the network interface 1645 and network 1650. The network interface(s) 1645 may include one or more application programming interfaces (APIs) that may allow the computer system 1600 to access remote systems and/or storages and also may allow remote systems and/or storages to access computer system 1600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1600 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the spirit and scope of the disclosure as defined by the following claims.

We claim:

1. A device that manages twist lock connectors for shipping containers, the device comprising:
   a platform that receives a shipping container;
   a connector changer associated with the platform;
   a shuttle associated with the platform, wherein the shuttle moves along a first linear path parallel to a surface of the platform; and
   a first handler that transfers twist lock connectors between the connector changer and the shuttle,
   wherein the connector changer moves along a second linear path that is perpendicular to the first linear path.

2. The device of claim 1 further comprising a pallet station, the pallet station comprising:
   a pallet that receives a plurality of twist lock connectors; and
   a second handler that transfers twist lock connectors between the shuttle and the pallet.

3. The device of claim 2, wherein the pallet comprises a plurality of receptacles and each receptacle in the set of receptacles receives one twist lock connector.

4. The device of claim 2, wherein the pallet comprises a bin that receives a plurality of twist lock connectors.

5. The device of claim 1, wherein the connector changer rotates a portion of a selected twist lock connector to remove the selected twist lock connector from the shipping container or attach the selected twist lock connector to the shipping container.

6. The device of claim 1, wherein the first handler moves along the first linear path and a second linear path that is perpendicular to the first linear path.

7. A device that attaches twist lock connectors to shipping containers, the device comprising:
   a platform that receives a shipping container;
   a connector changer associated with the platform;
   a shuttle associated with the platform, wherein the shuttle moves along a first linear path parallel to a surface of the platform; and
   a first handler that transfers twist lock connectors between the connector changer and the shuttle,
   wherein the connector chancier moves along a second linear path that is perpendicular to the first linear path, and
   wherein the connector chancier attaches a selected twist lock connector to the shipping container.

8. The device of claim 7, further comprising a pallet station, the pallet station comprising:
   a pallet that receives a plurality of twist lock connectors; and
   a second handler that transfers twist lock connectors between the shuttle and the pallet.

9. The device of claim 8, wherein the pallet comprises a plurality of receptacles and each receptacle in the set of receptacles provides one twist lock connector.

10. The device of claim 8, wherein the pallet comprises a bin that provides a plurality of twist lock connectors.

11. The device of claim 7, wherein the connector changer rotates a portion of the selected twist lock connector to attach the selected twist lock connector to the shipping container.

12. The device of claim 7, wherein the first handler moves along the first linear path and a second linear path that is perpendicular to the first linear path.

13. A device that detaches twist lock connectors from shipping containers, the device comprising:
- a platform that receives a shipping container;
- a connector changer associated with the platform;
- a shuttle associated with the platform, wherein the shuttle moves along a first linear path parallel to a surface of the platform; and
- a first handler that transfers twist lock connectors between the connector changer and the shuttle,
- wherein the connector chancier moves along a second linear path that is perpendicular to the first linear path, and
- wherein the connector changer detaches a selected twist lock connector from the shipping container.

14. The device of claim 13 further comprising a pallet station, the pallet station comprising:
- a pallet that receives a plurality of twist lock connectors; and
- a second handler that transfers twist lock connectors between the shuttle and the pallet.

15. The device of claim 14, wherein the pallet comprises a plurality of receptacles and each receptacle in the set of receptacles receives one twist lock connector or a bin that receives a plurality of twist lock connectors.

16. The device of claim 13, wherein the connector changer rotates a portion of the selected twist lock connector to remove the selected twist lock connector from the shipping container.

17. The device of claim 13, wherein the first handler moves along the first linear path and a second linear path that is perpendicular to the first linear path.

* * * * *